United States Patent
Hawthorne et al.

(10) Patent No.: US 7,096,171 B2
(45) Date of Patent: Aug. 22, 2006

(54) TRAIN SIMULATOR AND PLAYBACK STATION

(75) Inventors: Michael J. Hawthorne, Arlington, TX (US); C. Mackay Foster, Burleson, TX (US)

(73) Assignee: New York Air Brake Corporation, Watertown, NY (US)

( * ) Notice: Subject to any disclaimer, the term of this patent is extended or adjusted under 35 U.S.C. 154(b) by 727 days.

(21) Appl. No.: 10/212,782

(22) Filed: Aug. 7, 2002

(65) Prior Publication Data

US 2004/0030538 A1 Feb. 12, 2004

(51) Int. Cl.
G06G 7/48 (2006.01)
G09B 9/02 (2006.01)
G09B 19/16 (2006.01)
G06F 19/00 (2006.01)

(52) U.S. Cl. .............................. 703/8; 703/7; 701/119; 434/29

(58) Field of Classification Search ............ 701/19, 701/20, 119; 703/8, 7; 434/29
See application file for complete search history.

(56) References Cited

U.S. PATENT DOCUMENTS

| | | | |
|---|---|---|---|
| 3,885,324 A | 5/1975 | Davenport et al. | |
| 3,957,236 A | 5/1976 | Phelps et al. | |
| 4,041,283 A * | 8/1977 | Mosier | 701/20 |
| 4,042,810 A | 8/1977 | Mosher | |
| 4,181,943 A | 1/1980 | Mercer, Sr. et al. | |
| 4,236,215 A | 11/1980 | Callahan et al. | |
| 4,301,899 A | 11/1981 | McSparran et al. | |
| 4,344,364 A | 8/1982 | Nickles et al. | |
| 4,602,335 A | 7/1986 | Perlmutter | |
| 4,735,385 A | 4/1988 | Nickles et al. | |
| 4,750,888 A | 6/1988 | Allard et al. | |
| 4,827,438 A * | 5/1989 | Nickles et al. | 703/8 |
| 4,853,883 A * | 8/1989 | Nickles et al. | 703/8 |
| 4,952,152 A * | 8/1990 | Briggs et al. | 434/69 |
| 5,280,418 A | 1/1994 | Griffin | |
| 5,354,202 A | 10/1994 | Moncrief et al. | |

(Continued)

FOREIGN PATENT DOCUMENTS

EP 0 114 633 A1 8/1984

(Continued)

OTHER PUBLICATIONS

Senini, S. et al., "Dynamic Simulation of Wheel-Rail Interaction for Locomotive Traction Studies." Proc. of the 1993 IEEE/ASME Joint Railroad Conf. Apr. 6-8, 1993. pp. 27-34.*

(Continued)

*Primary Examiner*—Paul L. Rodriguez
*Assistant Examiner*—Ayal I. Sharon
(74) *Attorney, Agent, or Firm*—Barnes & Thornburg LLP

(57) ABSTRACT

A portable train simulator, including a microprocessor, a display and an input device for the microprocessor. A first program drives the display to depict indicia of a control stand and to respond to control inputs from the input device. A second program drives the display to depict a track to be traversed from a data file in response to the control inputs. A virtual control stand is one of the elements that allows the true portability of a train simulator. The system can display and switch between the present operating parameters of the train and/or a history of the operating parameters of the train, as selected by the input device. Thus, the system can switch from playback mode to simulation mode to provide a take-over of recorded conditions to allow an operator to explore alternate methods for managing the train.

5 Claims, 4 Drawing Sheets

U.S. PATENT DOCUMENTS

| | | | |
|---|---|---|---|
| 5,368,484 A * | 11/1994 | Copperman et al. | 434/69 |
| 5,550,738 A | 8/1996 | Bailey et al. | |
| RE35,590 E * | 8/1997 | Bezos et al. | 455/456.1 |
| 5,744,707 A | 4/1998 | Kull | |
| 5,758,299 A | 5/1998 | Sandborg et al. | |
| 5,893,893 A | 4/1999 | Holt et al. | |
| 6,144,901 A * | 11/2000 | Nickles et al. | 701/19 |
| 6,219,595 B1 * | 4/2001 | Nickles et al. | 701/19 |
| 6,226,577 B1 | 5/2001 | Yeo | |
| 6,263,266 B1 * | 7/2001 | Hawthorne | 701/19 |
| 6,371,416 B1 | 4/2002 | Hawthorne | |
| 6,382,378 B1 | 5/2002 | Cornic | |
| 6,480,766 B1 | 11/2002 | Hawthorne et al. | |
| 2002/0183995 A1 * | 12/2002 | Veitch et al. | 703/7 |

FOREIGN PATENT DOCUMENTS

| | | |
|---|---|---|
| EP | 0 257 662 A2 | 3/1988 |
| EP | 0 539 885 A2 | 5/1993 |
| EP | 0 755 840 A1 | 1/1997 |
| GB | 2 188 464 A | 9/1987 |
| WO | WO 90/03622 | 4/1990 |

OTHER PUBLICATIONS

Mathew, R. et al. "Locomotive 'Total Systems' Simulation Using SIMULINK." Int'l Conf. on Electric Railways in Europe. Mar. 27-30, 1995. pp. 202-206.*

Martin, P. "Train Performance and Simulation." Proc. 31st Winter Simulation Conf. 1999. pp. 1287-1294.*

Atala, O. et al. "A General Rapid Transit Simulation Model with Both Automatic and Manual Train Control." Proc. 24th Winter Simulation Conf. 1992. pp. 1307-1311.*

"New York Air Brake TDS-5000 Simulator". http://www.nyab.com/download/products/tds5000.pdf. Undated. Printed on Mar. 9, 2006.*

* cited by examiner

TRAIN SIMULATOR AND PLAYBACK STATION

BACKGROUND AND SUMMARY OF THE INVENTION

The present invention relates generally to train locomotive simulators and playback stations and more specifically to improvements thereto.

Simulators, for example, the Train Dynamics Analyzer (TDA), a long standing Locomotive Engineer training tool offered by the Train Dynamics Services Group of New York Air Brake, have been used to train engineers. The TDA functionality was enhanced to assist in training Locomotive Engineers on how to better handle their trains. Designs of simulators with math models are shown in U.S. Pat. Nos. 4,041,283; 4,827,438 and 4,853,883. Further capability was added to investigate accidents by playing back the event recorder data through the TDA, monitoring critical physical parameters. Through the years, data was collected from instrumented trains and laboratory experiments, allowing the models used by the TDA to be refined. On board data collection for off-loading is shown in U.S. Pat. Nos. 4,561,057 and 4,794,548.

As more Locomotive Engineers became familiar with the TDA display through training sessions, it became apparent that a real-time version of the TDA in the cab of a locomotive would offer substantial benefits in improved train handling. Earlier designs for on board computer controllers are shown in U.S. Pat. No. 4,042,810 with a description of math models. A Locomotive Engineer Assist Display and Event Recorder (LEADER) system, as described in U.S. Pat. No. 6,144,901, is a real-time, enhanced version of the Train Dynamics Analyzer (TDA).

The LEADER system has the ability to display a real-time or "live" representation of a train on the current track, the trackage ahead, the dynamic interaction of the cars and locomotives (both head end and remote), and the current state of the pneumatic brake system. As a tool for the Locomotive Engineer, the LEADER system allows insight into the effect of throttle changes and brake applications throughout the train providing feedback and information to the Locomotive Engineer not currently available. The information offered by the LEADER system provides an opportunity for both safer and more efficient train handling leading to enormous potential economic benefits.

The LEADER system has all the necessary information to predict the future state of the train given a range of future command changes (what if scenarios). With this ability, LEADER can assist the railroads in identifying and implementing a desired operating goal; minimize time to destination, maximize fuel efficiency, minimize in train forces, (etc.) or a weighted combination thereof. LEADER will perform calculations based on the operational goal and the current state of the train to make recommendations to the Locomotive Crew on what operating changes will best achieve these goals.

TDAs are usually available at a training site and are not typically mobile or portable. Also, LEADER systems are available on the train and are also generally not portable. There is a need in the industry for a truly portable simulator and playback station. One of the limitations of providing a truly portable simulator is a need to provide a control stand that replicates the actual control devices on a locomotive. These include propulsion and multiple braking control valves.

Displays for train simulators are exemplified by FIG. 5 of U.S. Pat. No. 6,144,901. It includes display of conditions throughout the trains in graphic representation, as well as a display of numerical values. Another type of display, known as a Strip Chart Display, is exemplified by FIG. 5 of U.S. Pat. No. 4,236,215. Both forums provide different kinds of information for different purposes. Although the simulator display of the LEADER system provides forces throughout the train, the Strip Chart provides a historical record in a playback mode of values as a function of time. Also, these systems have either operated in the playback mode or a simulation mode with no crossover.

The present invention addresses one of these issues by providing a truly portable train simulator, including a microprocessor, a display and an input device for the microprocessor. A first program drives the display to depict indicia of a control stand and to respond to control inputs from the input device. A second program drives the display to depict a track to be traversed from a data file in response to the control inputs. A virtual control stand is one of the elements that allows the true portability of a train simulator. The input device may include one or more of a keyboard, mouse and/or a touch screen.

The first program produces depictions of throttle indicia of position and direction, dynamic brake indicia of position, independent brake indicia of position and automatic brake indicia of position. The first program may also produce depictions, for a remote unit, of throttle indicia of position and dynamic brake indicia of position. Further, the first program may produce depictions of the status of one or more of the independent brake bail-off and emergency brake control by automatic brake. The first program may also produce depictions of auxiliary functions, including one or more of horn, bell, sand, call bell, remote sand and lead sand. The first program may also produce depictions of indicators or warnings, including one or more of power control switch is open, sand, force alarm, wheel slip, remote wheel slip, alert alarm and overspeed alarm.

The first program may further produce depictions of one or more of train speed, air flow rate, feed valve pressure, brake pipe pressure, brake cylinder pressure, equalization reservoir pressure, percentage of power reduction and dynamic amperes. The first program allows adjustment of the feed rate valve pressure via the input device. The first program may also allow adjustment of the percentage of power reduction via the input device.

The simulator is a portable computer, including the microprocessor, the input device and the display. The first and second programs and the data file are in one of either the portable computer or a second microprocessor. The portable computer and the second microprocessor are connected, for example, by an Ethernet network. This allows the programs to be in either or both locations.

A third program is included to drive the display to depict operating parameters of the train. The produced depictions represent either the present operating parameters of the train or a history of the operating parameters of the train as selected via the input device. The depiction of the history of the operating parameters can be displayed correlated to the depiction of the track.

In a playback mode, the data file would include the track with correlated values of the control stand for a run of a train on the track. A fourth program for playing back the data file would provide the control stand values as control inputs to the first and second programs. The ability to switch from the playback mode to a simulation mode using the playback data is provided by a fifth program. The fifth program is responsive to a selection input from the input device to initially transfer the control stand values from the data file to the first program as control inputs, and, subsequently, the first program is responsive to the control inputs from the input device.

The data file includes the track with correlated operating parameters for a run of a train on the track. The fourth program plays back the data file by driving the display to depict the operating parameters correlated to the track display. The third program drives the display to depict the present operating parameters of the train or a history of the operating parameters of the train as selected via the input device. The operating parameters to be displayed are selected via the input device. The present operating parameters of the train may be depicted with the history of the operating parameters of the train at a point on the track selected via the input device.

A playback station, according to another aspect of the present invention, portable or not, includes a microprocessor, a display and an input device for the microprocessor. It also includes a data file of a track with correlated operating parameters for a run of a train on the track. A first program plays back the data file by driving the display to selectively depict the operating parameters correlated to the track either as the present operating parameters of the train or a history of the operating parameters of the train. The operating parameters to be displayed are selected via the input device. The operating parameters of the train may be depicted with the history of the operating parameters of a train at a point on the track selected via the input device. A second program operates the playback station as a simulator using the track of the data file by initially using the operating parameters from the data file as inputs and subsequently using the inputs from the input device to derive the operating parameters.

A simulator, according to another aspect of the present invention, portable or not, also includes a microprocessor, a display and an input device for the microprocessor. A simulator would use a data file of a track with correlated operating parameters for a run of a train on the track. A first program for playing back the data file drives the display to depict the operating parameters correlated to the track. A second program simulating a run using the track of the data file by initially using the operating parameters from the data file as inputs and subsequently using inputs from the input device to derive the operating parameters.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
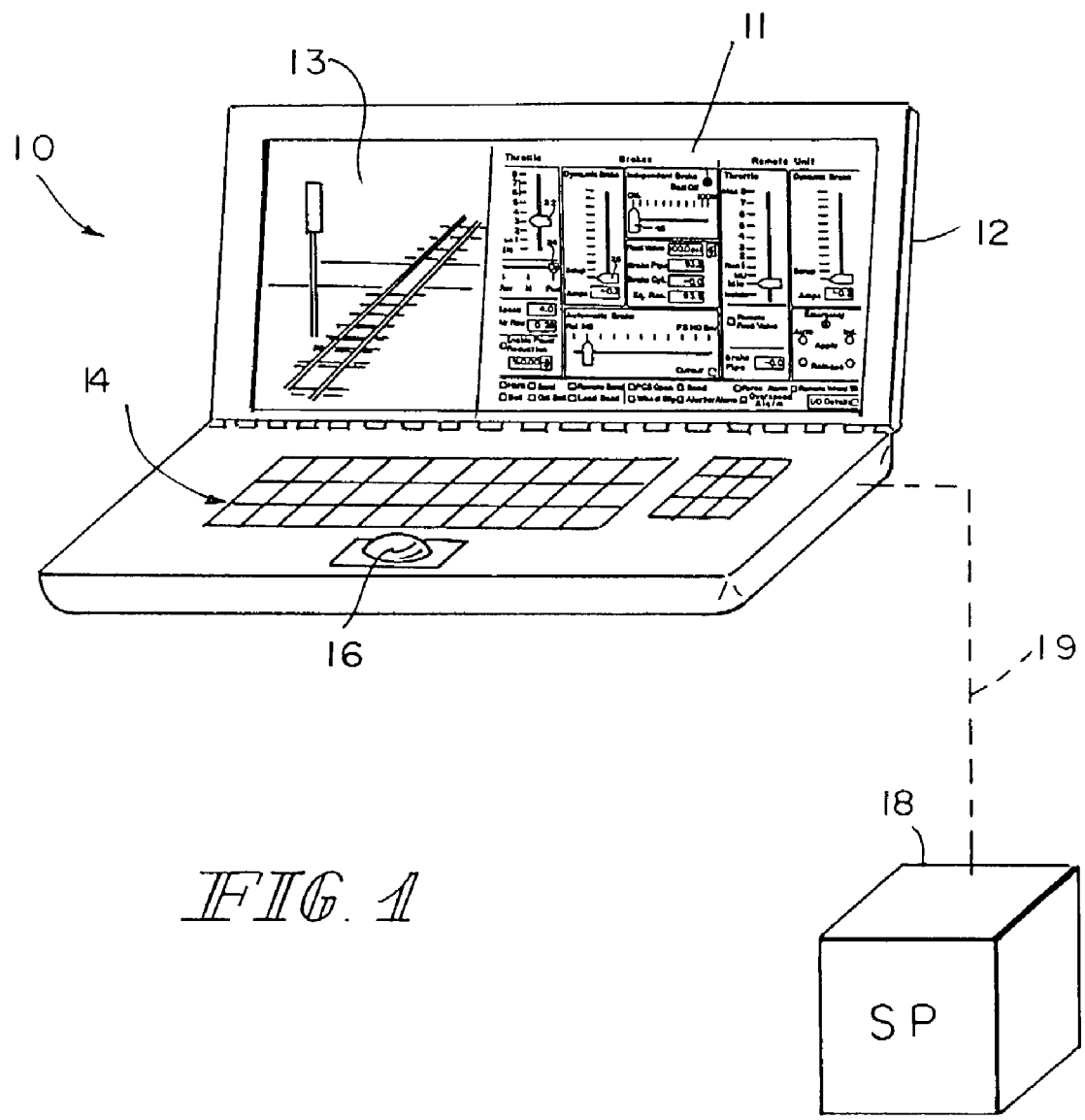
FIG. 1 is a perspective view of a portable simulator and playback station, according to the principles of the present invention.

A portable simulator and/or playback device 10 is illustrated in FIG. 1. It is illustrated as a portable, personal computer. It includes a microprocessor and an integral display 12. It includes an input device for the microprocessor. The input devices include a keyboard 14, a mouse 16 or the touch screen of display 12. The program for simulation or playback is included in the microprocessor or may lie in a remote microprocessor 18. The portable simulator 10 may be connected to the remote microprocessor 18 by a network 19. The network may be, for example, the internet.

Figure 2:
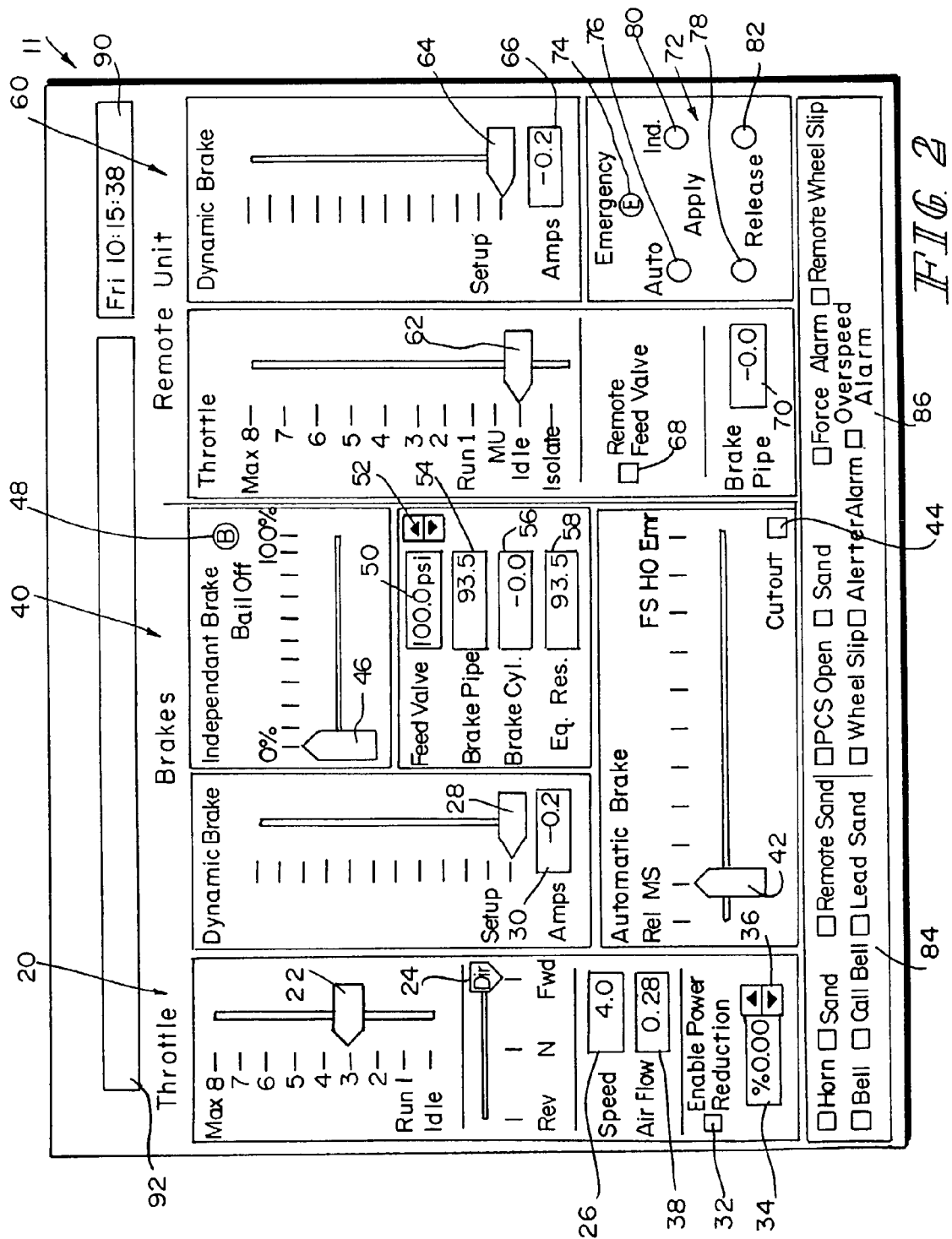
FIG. 2 is an illustration of a display of a virtual control stand.
Figure 3:
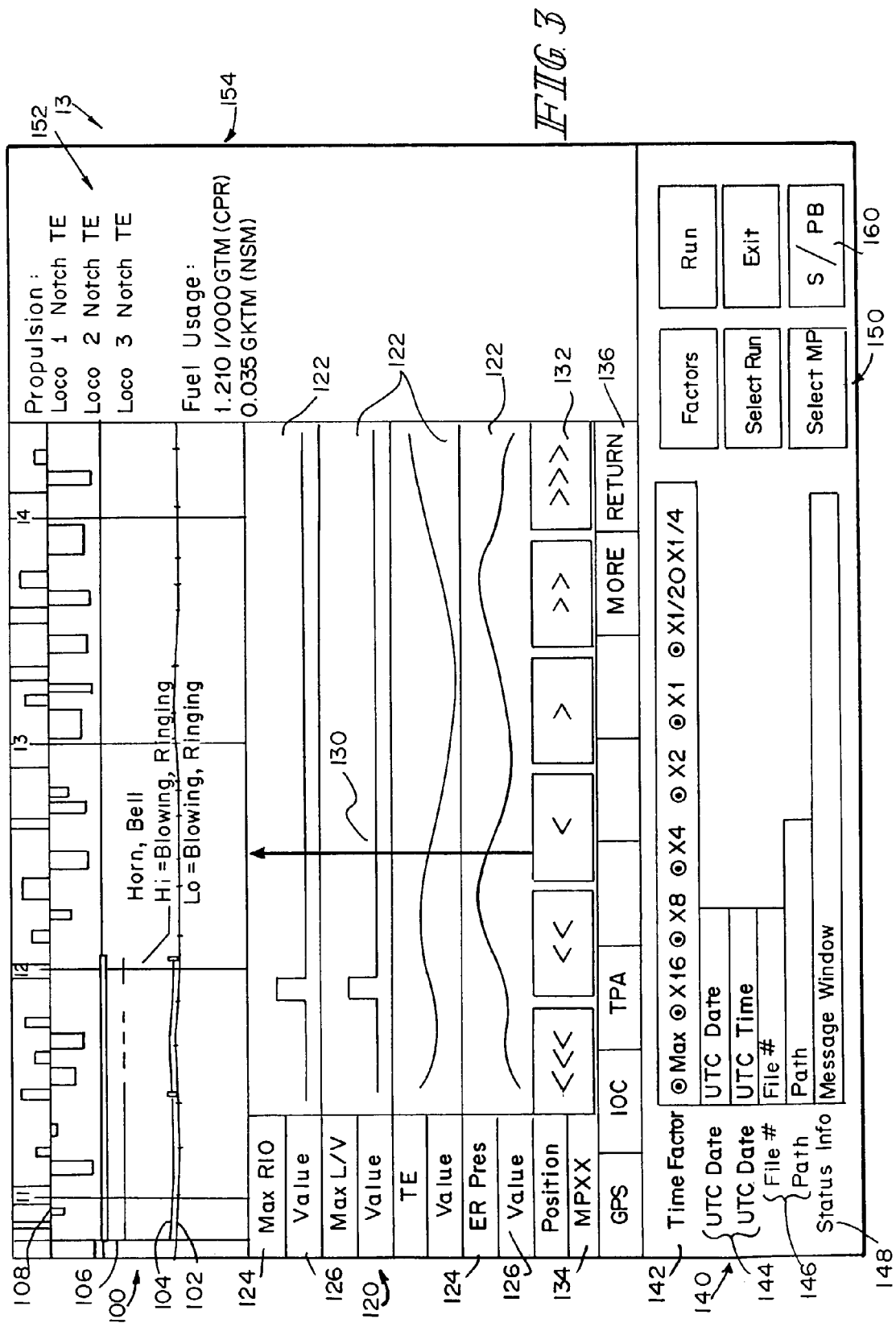
FIG. 3 illustrates a display including a strip chart, according to the principles of the present invention.

The display 12 may be a split display, as illustrated, with a virtual control stand 11 and a depiction of a track to be traversed 13. One detailed embodiment of the virtual control stand 11 is illustrated in FIG. 2, and one example of the track to be traversed with other information is illustrated in FIG. 3. Alternatively, the displays 11 and 13 may be full-screen displays with the ability to switch there between. As with many other software-based systems, multiple screens may be displayed side-by-side, staggered or full-screen reduced and restored.

An example of a virtual control stand that allows the simulator and playback station to be truly portable is illustrated in FIG. 2. Virtual control stand 11 includes a throttle portion 20 having a throttle position indicator and controller 22 extending between throttle run positions 1 and 8 and idle. It also includes a direction selection indicator 24 between forward, reverse and neutral. The window 26 indicates the speed of the vehicle. The dynamic brake portion indicator and controller 28 is part of the brake control, and the opposite position of the throttle is provided. A window 30 to display the amperes of the dynamic brake and traction motor current (both for DC locomotives) is also provided. An enable power reduction button 32 is provided, as well as an adjustment 36 for the amount of power reduction in window 34. Window 38 illustrates the air flow rate in the brake pipe.

The brake portion 40 of the virtual control 11 includes an automatic brake indicia and controller 42 and an automatic brake cut-out button 44. This is to control the brake pipe for train braking. The independent brake for the locomotive includes an independent brake indicia and controller 46 and a bail-off or actuate button 48. The bail-off button 48 allows release of the independent brakes of the locomotive. Window 50 shows the feed valve value, which is adjusted by button 52. Window 54 illustrates a brake pipe pressure, window 56 the brake cylinder pressure and window 58 the equalization reservoir pressure.

Section 60 indicates the value of the controls for a remote locomotive unit. Slide 62 provides an indication and control of the throttle position, and slide 64 indicates and controls the amount of dynamic brake. Window 66 displays the amperes of both the traction motors and dynamic brake system (for DC locomotives). Button 68 controls the remote feed valve. Window 70 indicates the brake pipe pressure at the remote locomotive unit.

Section 72 illustrates pneumatic brake controls for trains with the remote power. It includes a control 74 for an emergency brake at the remote unit. Buttons 76 and 78 apply and release the automatic brakes, and buttons 80 and 82 apply and release the independent brakes for the remotely controlled locomotives.

Panel 84 depicts the auxiliary functions of the locomotive. These functions both control the function and indicate their status. This includes horn, bell, sand, call bell, remote sand and lead sand. Panel 86 provides indicia depicting the status or warnings. It includes power cutout switch open, wheel slip, sand, alerter alarm, overspeed alarm and remote wheel slip. Window 90 is a clock illustrating the date and time. Window 92 is a screen for miscellaneous messages to the engineer.

The majority of the depicted indicia and controls are those available on a standard control stand. The position of the indicia for the throttle dynamic brake, independent brake, automatic brake and those elements on the remote unit are controlled by an input device. As previously discussed, this may be the keyboard 14, the mouse 16 or a touch screen control. One or more software programs may be provided to drive the display to depict the various elements of the virtual control stand 11, as well as the changing of the controls in response to control inputs from the input device. Other control devices may also be implemented with the virtual control stand 11. These may include combined throttle and dynamic brake and other distributed power interfaces.

The depiction of the track 13 may be a video of the track or CGI, as illustrated in FIG. 1, which shows a track plus a crossing and a signal light. A second program in the portable simulator 10 has data file of the track and provides it as the train moves along the track. This second program is also responsive to the inputs from the first program or control stand to appropriately progress along the track based upon the stored conditions of the track from the data file, as well as inputs from the throttle and brakes from the control stand 11.

Alternatively, the track display 13 may be that illustrated in FIG. 3. The track display portion 100 includes the track profile in three views. The train may be represented on the track in these views. The horizontal view of the track 102 shows the grade in which the train is currently positioned and the grade of the track profile for a number of miles. It shows the geographic shape as a vertical slice of the track profile. An overhead or vertical view 106 incorporates symbols that represent track structure, such as crossing, signals, overpasses, underpasses and sidings. The track curvature representation 108 is made up of blocks that represent track curvature. A block above the dividing line represents a curvature to the right, and a block below the dividing line represents a curvature to the left. The longer the block, the longer the curvature. The higher the block, the more severe the curve. This example of a TDA display or a LEADER display is shown in U.S. Pat. No. 6,144,901.

The track view 100 may also be provided in the same software for, and be an alternative to, the graphic display of FIG. 1. If the LEADER system is available on the locomotives for that railroad, the LEADER display would be preferable for training purposes. It should also be noted that a full LEADER display, as shown in FIG. 5 of U.S. Pat. No. 6,144,901, may also be provided in the portable simulator 10.

The display of operating parameters may be on the virtual control stand 11, as shown in FIG. 2, or part of the track display 13, as shown in FIG. 3. Whereas the control stand display of operating parameters is for the present operating parameter, the display in the track portion 13 is correlated to the track position and represents a history of the operating conditions as the lead locomotive traverses the track. Both may also be displayed. If a standard LEADER-type display is used, the present conditions of the operating parameters would be illustrated as part of the track display 13.

Section 120 of the display 13 of FIG. 3 is a strip chart representation of operating parameters. It illustrates the history of the parameter correlated to the location of the track. Even though the representation 120 in FIG. 3 shows the history of a portion of where the train has not reached yet, in a simulator mode it will display only that portion which the train has traversed. The illustration FIG. 3 is a playback mode wherein the data file includes the depiction of the track and its correlated operating parameters. The operating parameter display may also be configured to show values ahead of the train if so desired by the user in the playback mode.

It should be noted that display 13 of FIG. 3 may be used on any simulator or playback station whether it is portable or not. It may be used with or without a control stand for playback analysis of data collected from a train on a particular run with the operating parameters correlated to the track information.

The Strip Chart Display 120 includes a plurality of graphics 122 illustrating the value of the operating parameter. Window 124 indicates the name of the value, and 126 would display the actual numerical value at the position selected by pointer 130. Controls 132 move the pointer to the position on the track display. The position in miles is indicated in Window 134. A row of buttons 136 provides the standard control of the track display 100. This allows moving of the track display and the correlated operating parameters by time, location or other operational parameters. The zoom in and out control provides the amount of track shown. The movement of the playback may be accelerated, real time or for actual playback speed control.

The operating parameters 124 to be displayed may be selected. These may include, but not be limited to, tractive effort, dynamic brake effort, end of train brake pipe pressure, run in/out (RIO) forces, brake system pressures, lateral over vertical(L/V) force ratio, traction motor current, traction motor voltage, speed, speed limit, acceleration, heading, buff/draft forces, minimum safe brake pipe reduction, actual brake pipe reduction, fuel consumed, horn use, bell use, throttle setting and dynamic brake setting. This system may also automatically identify exceptions, such as overspeed, and highlight these events on the display.

The control section 140 includes the time factor 142, the time and date for the run 144, the file and path number 146 and a miscellaneous status information message window 148. The controls 150 provide control of the time factor 142, the run selection and the select parameter button. It also provides control of a run by a start and stop button, as well as an exit from the program. Display 152 provides the propulsion controller position of each locomotive in the train, as well as provides the fuel usage 154. As previously discussed, the whole history section 120 is displayed in a playback station and only that which has transpired would be displayed in a simulator. The playback system will allow the operator to select a location by track position in either the strip chart representation or the LEADER system representation and be able to flip back and forth between the two. All presented data would be accurate for each screen with the position of the train in the playback being preserved.

Figure 4:
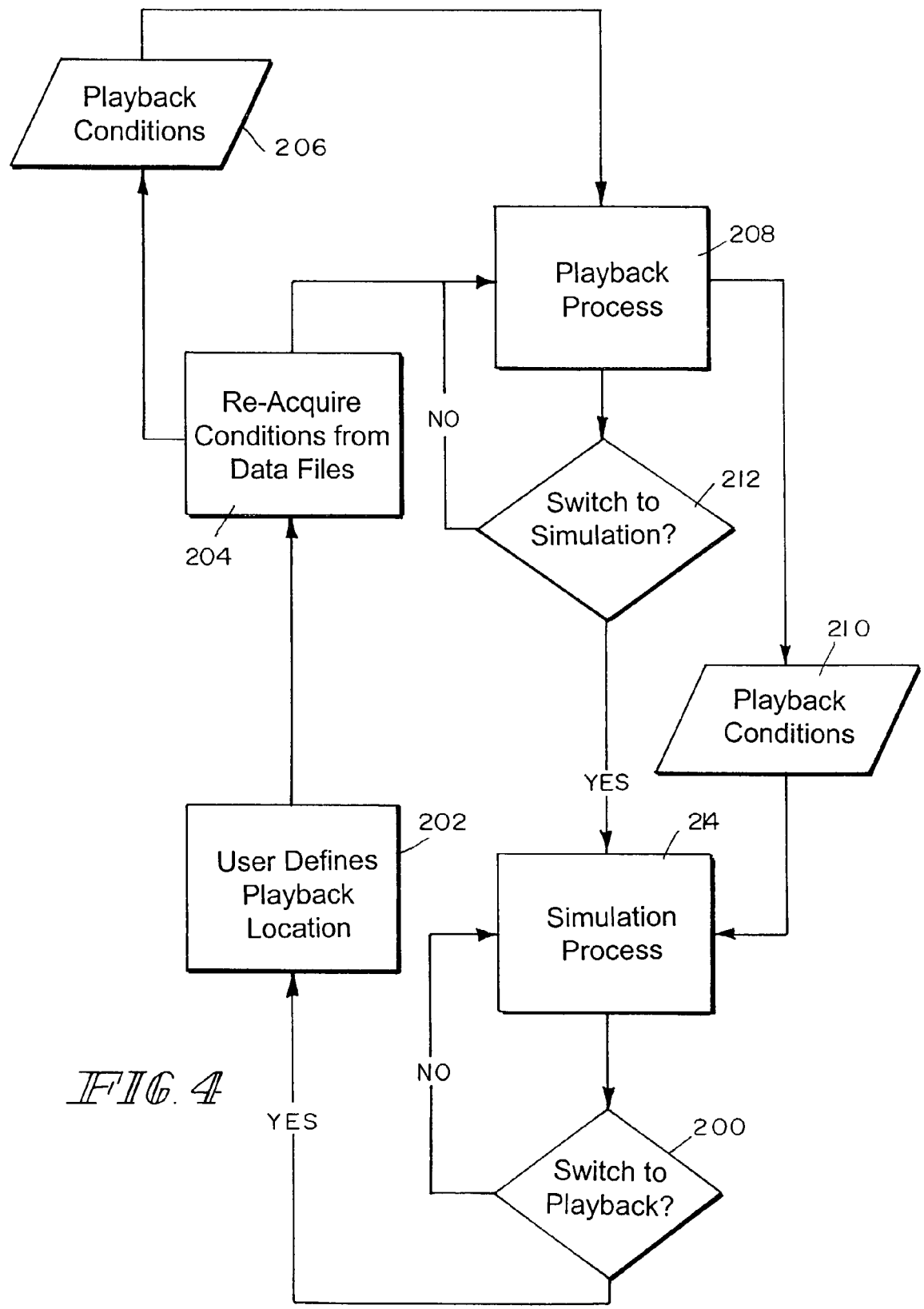
FIG. 4 is a flow diagram illustrating the taking over or switching between playback and simulation modes.

Portable simulator and playback station 10, or any other simulator and playback station, whether portable or not, may also be provided with a program to allow the transition from playback to simulation as illustrated in FIG. 4. During playback process 208, the information from a data file at 204 that has track information correlated with operating parameters, as illustrated in FIG. 3, is played back. The operating parameters may be in the strip chart version, as indicated in 120, or in the numerical values. During playback, the control inputs for the software of the track display comes from the data file 204.

A button 160 allows switching the program from simulation (S) to playback (PB). At the point the button is pushed during playback 208 to switch at 212 to simulation at 214, the track information from the data file is displayed, as well as the operating conditions from the playback source 210 with the initial conditions from the final state of the simulation session. From that point forward, the control signals to drive the track display and the operating parameters display is switched to the inputs from the control stand. It may include a standard control stand or the virtual control stand of FIG. 2. The input signals from the control stand will produce calculable, changing operating parameters versus pre-recorded operating parameters, as well as move the track display at the appropriate rate.

It should be noted that the data file with the correlated operating parameters may be from an actual locomotive, for example, event recorder data, an earlier simulation run or from other sources or forum. The track or time-coded data file may be manually created, for example, by scripting, or can be a modification of pre-existing data to create situations to which the engineer should respond or to supply missing or corrected suspected information in determining the cause of an accident or other failure.

The ability to switch back and forth between playback and simulation allows the operator to try different scenarios in analyzing pre-recorded data to determine appropriate corrective procedures, as well as to adjust the variables to determine causes of pre-recorded existing conditions. If it is a pre-recorded actual run of the engineer, it allows him to make different decisions to see what the results are. After using the system in simulator mode 214, the program can be switched at 200 back to playback mode 208 with the user identifying the desired track position at 202 and the system identifying the initial conditions of the recorded files for that desired track position 204. The playback conditions from 206 are the data for the initial conditions necessary to start the playback process 208

It should be noted that any of the virtual buttons on the screens of FIGS. 2 and 3 may be replaced by actual keys on a keyboard or switches. The virtual presentation is preferred in a portable setting.

Although the present invention has been described and illustrated in detail, it is to be clearly understood that the same is by way of illustration and example only and is not to be taken by way of limitation. The spirit and scope of the present invention are to be limited only by the terms of the appended claims.

What is claimed:

1. A playback station comprising:
   a microprocessor;
   a display;
   an input device for the microprocessor;
   a data file of a track with correlated operating parameters of a train for a run on the track;
   a first program for playing back the data file by driving the display to selectively depict the operating parameters correlated to the track either as the present operating parameters of the train or a history of the operating parameters of the train; and
   a second program for operating the playback station as a simulator using the track of the data file, and initially using the operating parameters from the data file as inputs and subsequently using inputs from the input device to derive new operating parameters and driving the display with the new operating parameters in the selected depiction.

2. The playback station according to claim 1, wherein the operating parameters to be displayed are selected via the input device.

3. The playback station according to claim 1, wherein the first program drives the display to depict the present operating parameters of the train with the history of the operating parameters of the train at a point on the track selected via the input device.

4. The playback station according to claim 1, wherein the first program drives the display to switch between the depiction of the present operating parameters of the train and the history of the operating parameters of the train at a point on the track selected via and in response to the input device.

5. A simulator comprising:
   a microprocessor;
   a display;
   an input device for the microprocessor;
   a data file of a track with correlated operating parameters of a train for a run on the track;
   a first program for playing back the data file by driving the display to depict the operating parameters correlated to the track; and
   a second program for simulating a run using the track of the data file by initially using the operating parameters from the data file as inputs, and subsequently using inputs from the input device to derive new operating parameters and driving the display with the new operating parameters.

\* \* \* \* \*